United States Patent Office 3,084,195
Patented Apr. 2, 1963

3,084,195
BIS-SULFINIC ACID-OLEFIN ADDUCTS
Michael T. Beachem, New Brunswick, and John T. Shaw, Middlesex, N.J., assignors to American Cyanamid Company, New York, N.Y., a corporation of Maine
No Drawing. Original application July 29, 1957, Ser. No. 674,553, now Patent No. 2,993,932, dated July 25, 1961. Divided and this application Mar. 7, 1960, Ser. No. 12,960
2 Claims. (Cl. 260—593)

This invention relates to new compounds of the bis-sulfone type represented by the following formula $$R(SO_2-CH_2-CH_2-X)_2$$

wherein R is selected from the group consisting of the unsubstituted hydrocarbon residue of cyclohexane or an aliphatic alkane of two to ten carbon atoms, different carbon atoms being connected to the $SO_2$ groups; and X is an aldehyde, acyl, carboxyl, nitrile, amide or ester group. As such, this application is concerned with those compounds in which X is the specific group $$-\overset{\overset{\displaystyle O}{\|}}{C}-CH_3$$

and constitutes a division of our copending application Serial No. 674,553, filed July 29, 1957, now U.S. Patent No. 2,993,932.

The new compounds are useful for a number of purposes, for example, when X is an ester group, as in our copending divisional application Serial No. 12,961, now U.S. Patent No. 3,040,088, they are plasticizers. When X is an amide group, as in our above-noted U.S. Patent No. 2,993,932 they are intermediates for textile finishes which are obtained by reacting the amide group with formaldehyde to give a methylol derivative. While the compounds are covered regardless of how they are made, in general, the best method is to react the corresponding bis-sulfinic acid compound with an activated olefin, forming an adduct. Some of the bis-sulfinic acids are known compounds but most of them are new chemical compounds and are not claimed as such in the present application, forming the subject matter of a copending application of Shaw, Hosler and Beachem, Serial No. 738,046, filed May 27, 1958, now U.S. Patent No. 2,917,540.

Typical bis-sulfinic acids are those in which R is 1,2-ethane; 1,3-propane; 1,4-butane; 1,5-pentane; 1,4(2-methyl butane); 1,6-hexane; 2,5-hexane; 1,4-cyclohexane; 1,10-decane; 1,5-decane; 1,2-decane; 4,7-decane; 2,6(2,6-dimethyl octane); 2,7(2,7-dimethyl octane); 1,5(3-pentyl-pentane) and the like.

Among typical olefin compounds are acrylic derivatives such as acrylonitrile, acrylamide and acrolein; acrylic esters; substituted acrylic derivatives such as crotonic acid; maleic acid; maleic esters; methylvinyl ketone, ethylvinyl ketone, and the like.

In general, in the preparation of the compound, the bis-sulfinic acid derivative is reacted with the olefinic compound in an aqueous medium. The reaction is quite rapid and usually proceeds readily at room temperature. As the bis-sulfinic acid is normally produced by reduction of the corresponding bis-sulfonyl chloride with sodium sulfite, it has been found that it is not necessary to isolate the intermediate bis-sulfinic acid. On the contrary, it is sufficient to acidify the reaction mixture and then react with the olefinic compound. However, if desired, an isolated bis-sulfinic acid may be used.

The invention will be described in greater detail in conjunction with the following specific examples, the parts being by weight unless otherwise specified.

EXAMPLE 1

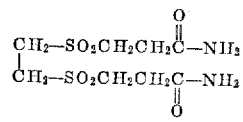

113.5 parts of 1,2-ethane-bis-sulfonyl chloride is added gradually to a solution of 132.5 parts of sodium sulfite in 500 parts of water. The temperature is maintained at about 5°–6° C. throughout the addition, and after the addition is complete stirring is maintained until the reaction has proceeded substantially to completion. Some unreacted 1,2-ethane-bis-sulfonyl chloride remains as a solid and is removed by filtration. The filtrate is then acidified with hydrochloric acid to a pH of 3 and stirred with an aqueous solution of 107 parts of acrylamide until the reaction is substantially complete. A white solid product precipitates out, is recovered by filtration and washed with water and alcohol and constitutes the product of the above formula. The constitution is confirmed by elementary and infrared analyses.

EXAMPLE 2

*1,4-Butane-Bis-Sulfinic Acid*

$$HO_2S(CH_2)_4SO_2H$$

To a solution of 65.5 parts of anhydrous sodium sulfite in 310 parts of water is added 128 parts of magnesium sulfate heptahydrate. A heavy precipitate is formed. The mixture is then heated to 40° C. and 51 parts of 1,4-butane-bis-sulfonyl chloride is added, care being taken that the reaction mixture remains alkaline to Brilliant Yellow Red which is effected by the addition of suitable amounts of solid magnesium hydroxide, the amount being of the order of magnitude of 23 parts. During the addition the temperature is maintained between 40° and 50° C. and is effected with agitation which is continued at the same temperature until the reaction is substantially complete. Thereupon, the reaction mixture is stirred and cooled to room temperature and finally chilled and the solid product removed by filtration and dried. The product analyzes as a magnesium salt of 1,4-butane-bis-sulfinic acid. The yield is excellent, but the product at this point contains extensive inorganic impurities.

Ninety-three (93) parts of the crude magnesium butane-bis-sulfinate described above and 100 parts of water is added to 200 parts of diethyl ether. The mixture is stirred and cooled to 5° C. and then 50 parts of 5 N sulfuric acid is added very gradually with stirring. A solid product of the free acid forms between the two liquid layers and constitutes 1,4-butane-bis-sulfinic acid with a melting point of 122°–126° C. The product is not completely pure and upon recrystallization colorless crystals are obtained.

EXAMPLE 3

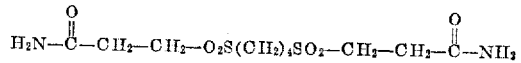

A mixture of 0.5 part of the product of Example 2 and 0.7 part of acrylamide in 20 parts of water is stirred until reaction is complete. As the reaction proceeds a white solid is formed which precipitates, and finally the reaction product is filtered and the precipitate purified by recrystallization from water. Analysis shows the resulting compound to have the above formula.

EXAMPLE 4

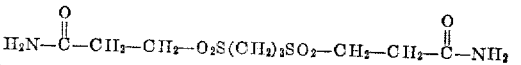

0.9 part of a mixture of the zinc salt of 1,3-propane-bis-sulfinic acid and inorganic salts (containing about 41% of the real zinc 1,3-propane-bis-sulfinate) is dissolved in 10 parts of water with the addition of sufficient 10% hydrochloric acid to cause the formation of a clear solution. 0.7 part of acrylamide in 10 parts of water is then stirred in at room temperature and stirring maintained until the reaction is complete. A crystalline solid starts to precipitate after the acrylamide has been added and finally the reaction mixture is filtered, the precipitate washed with water, ethanol and anhydrous ether, giving a pure product which is shown by analysis to have the above formula.

EXAMPLE 5

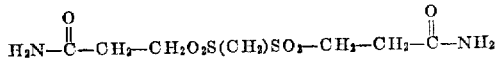

A solution is prepared of 34.4 parts of sodium sulfite, 47 parts of sodium bicarbonate and 130 parts of water. To this solution there is added with stirring 35 parts of 1,5-pentane-bis-sulfonyl chloride. The addition is gradual and at room temperature. After the addition is completed, the mixture is heated to 70°–80° C. and stirred at this temperature until reaction is complete. Thereupon the reaction mixture is cooled down to 5° C. and a residue of inorganic salts which precipitates out is removed by filtration. The filtrate is then acidified with concentrated hydrochloric acid to a pH of 3 and there is added 27.7 parts of acrylamide, together with a small amount of water. A fine, colorless crystalline product starts to precipitate and the stirring is maintained until the reaction is complete. Thereupon the reaction mixture is filtered and the precipitate purified by recrystallization from water. Analysis shows that the compound has the above formula.

EXAMPLE 6

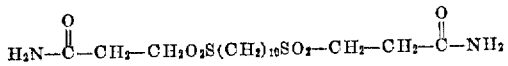

The procedure of Example 5 is repeated, replacing the 1,5-pentane-bis-sulfonyl chloride with an equivalent amount of 1,10-decane-bis-sulfonyl chloride. Analysis shows the product to have the above formula.

EXAMPLE 7

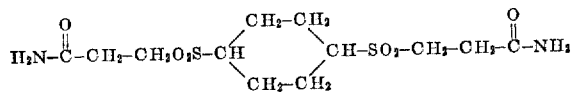

The procedure of Example 5 is repeated except that an equivalent amount of 1,4-cyclohexane-bis-sulfonyl chloride is used in place of the 1,5-pentane-bis-sulfonyl chloride. Analysis shows that the product corresponds to the above formula.

EXAMPLE 8

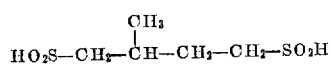

A mixture of 100 parts of water, 26.9 parts of 2-methyl-butane-1,4-bis-sulfonyl chloride, 36.1 parts of sodium bicarbonate and 26.4 parts of sodium sulfite is heated with stirring at 45°–50° C. until solution is complete. (The sulfonyl chloride is obtained from a corresponding 1,4-dibromo compound by the Strecker synthesis with alkyl halide and alkali metal sulfite, followed by treating the sodium salt of the resulting disulfonic acid with phosphorus pentachloride.) The pH of the solution is about 7.5 and the mixture is slightly cloudy. The temperature is raised to 70°–80° C. and stirring continued until the reaction is complete. The cloudy mixture is then filtered at 50° C. and the clear filtrate cooled to 5° C. and acidified by the gradual addition of concentrated hydrochloric acid. A solid precipitates which is filtered off and dried, and after recrystallization from water, is identified as pure 2-methylbutane-1,4-bis-sulfinic acid.

EXAMPLE 9

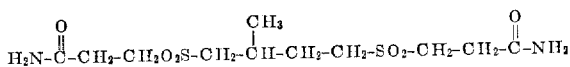

0.54 part of the product of Example 8 is dissolved in 10 parts of water and 0.7 part of acrylamide stirred in at room temperature. A white solid begins to precipitate and the stirring is maintained until the reaction is substantially complete. The mixture is thereupon filtered and the precipitate further purified by recrystallization from water. Analysis shows that it has the formula given above.

EXAMPLE 10

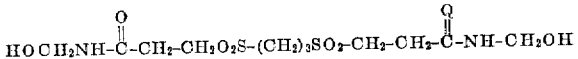

7.8 parts of the product of Example 4 is added to 24.2 parts of 37% aqueous formaldehyde solution previously adjusted to a pH of 11.6 with 10% sodium hydroxide. The mixture is gradually heated to 80° C. and maintained at this temperature until reaction is substantially complete. During the reaction the pH drops somewhat and is again adjusted to a pH of 8 with sodium hydroxide solution. The reaction mixture is then cooled to about 60° C. and a precipitate which formed removed by filtration, washed with alcohol and ether. The product is then purified by recrystallization from a mixture of dimethyl formamide and water. Analysis corresponds to the formula given above.

An emulsion of the above product in water is prepared and is applied to Rachelle netting and the netting dried and cured for 4 minutes at 300° F. An improved and stiffer hand is imparted to the netting.

EXAMPLE 11

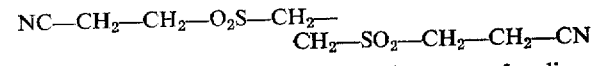

An aqueous solution containing 10.1 parts of sodium 1,2-ethane-bis-sulfinate is acidified to a pH of 3 with hydrochloric acid and 8.84 parts of acrylonitrile added. Sufficient water is then added with stirring until all of the acrylonitrile dissolves and stirring is maintained at room temperature until the reaction is complete. A crystalline solid which precipitates, is recovered by filtration and washed with water, ethanol and ether. This product is recrystallized from 200 parts of water, giving a fine, colorless crystalline product which corresponds to the formula above.

EXAMPLE 12

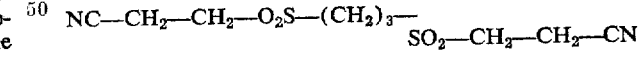

22 parts of the crude zinc salt of 1,3-propane-bis-sulfinic acid described in Example 4 is dissolved in 50 parts of water. The mixture is stirred and is gradually acidified with concentrated sulfuric acid until it is clear. Thereupon a solution of 5.3 parts of acrylonitrile and 100 parts of water is added and the solution stirred at room temperature until reaction is substantially complete. A crystalline solid separates out which is filtered off, washed with water, ethanol and ether and is then further purified by recrystallization from water. Analysis shows that it has the formula given above.

EXAMPLE 13

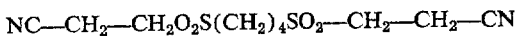

A solution of 3.72 parts of the product of Example 2 and 13 parts of water is prepared and 3.18 parts of acrylonitrile added. The mixture is then heated with agitation to 40° C., and maintained at this temperature until reaction is complete. A solid precipitate forms and is removed by filtration after chilling the mixture, the precipitate being washed with methanol. The precipitate is purified by extracting with hot water and precipitating by cooling, producing a product which analysis shows is a compound of the above formula. A small amount of side reaction occasionally takes place, namely, polymerization of acrylonitrile, and this solid remains in the crude precipitate when extraction with hot water takes place. The final purified product, however, is substantially free from acrylonitrile polymers.

EXAMPLE 14

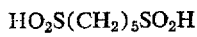

450 parts of 1,5-pentane-bis-sulfonyl chloride is added to a slurry of 422 parts of sodium sulfite, 563 parts of sodium bicarbonate and 1675 parts of water at 40°–50° C. The reaction mixture is then heated to 75°–85° C. and maintained at this temperature until the reaction is substantially complete, whereupon the reaction mixture is cooled down to room temperature and some insoluble matter which precipitates out is removed by filtration. To 1525 parts of the filtrate there is slowly added a solu- of 479 parts of zinc chloride and 500 parts of water. Considerable frothing occurs and a white precipitate forms, making stirring difficult and requiring the addition of a further 400 parts of water. After the precipitation is complete, the solid product is removed by filtration, dried, and 270 parts of the dried material dissolved in 180 parts of 13.7% hydrochloric acid, warming somewhat to effect solution. The solution is clarified while hot and the filtrate cooled to −10° C. The solid product which precipitates out, is filtered off and recrystallized twice from a small amount of 20% hydrochloric acid. Recrystallization is continued until the product melts at 94°–95° C. It is then dried over phosphorous pentoxide and becomes very waxy and the melting point drops to 72°–86° C. Analysis, including infrared analysis, shows that the product is pure 1,5-pentane-bis-sulfinic acid.

EXAMPLE 15

$$NC-CH_2-CH_2-O_2S-(CH_2)_5SO_2-CH_2-CH_2CN$$

To a solution of 8.6 parts of the product of Example 14 there is added a solution of 6.9 parts of acrylonitrile and 100 parts of water. The mixture is then stirred until reaction is complete. A white product separates out which is removed by filtration and is then purified by recrystallization from 25 parts of water. Analysis shows that it corresponds to the formula above.

EXAMPLE 16

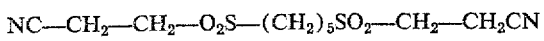

A mixture of 100 parts of water, 26.5 parts of sodium sulfite and 36.1 parts of sodium bicarbonate is prepared and heated to 45°–50° C. Thereupon 29.3 parts of 2,5-hexane-bis-sulfonyl chloride is added gradually. After the addition the pH is about 7.5 and the solution is slightly cloudy. Stirring is continued at 70°–80° C. until the reaction is complete. The cloudy reaction mixture is then filtered at 50° C. and the clear filtrate cooled to 5° C. and acidified by the gradual addition of concentrated hydrochloric acid. A solid precipitates which is filtered off, dried, and after recrystallization from water is identified as the product of the formula above.

EXAMPLE 17

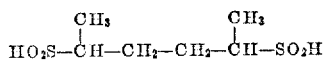

The procedure of Example 13 is repeated except that 4.3 parts of the product of Example 16 is used. The product obtained is shown by analysis to correspond to the formula above.

EXAMPLE 18

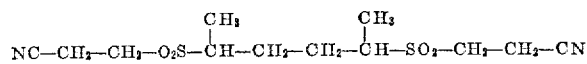

A solution of 1.5 parts of technical maleic acid is made in 6 parts of water and clarified. There is then added 0.62 part of the product of Example 2 and 2 parts of water. A clear solution results which is stirred at room temperature until reaction is complete. A product precipitates out which is removed by filtration and washed with water, ethanol and ether. The product is then recrystallized from water in fine, colorless crystals which are shown by analysis to correspond to the above formula.

Salts of the above acid are prepared by treating with dilute aqueous alkali such as aqueous sodium hydroxide, potassium hydroxide, or calcium hydroxide. The salts are white solids.

EXAMPLE 19

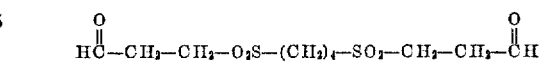

1.68 parts of acrolein are dissolved in 20 parts of water, and 1.86 parts of the product of Example 2 in 10 parts of water is added. The mixture is stirred and soon becomes cloudy and a solid product precipitates. Stirring is maintained until reaction is complete and the product is then removed by filtration, washed with ethanol and ether. The product is recrystallized by dissolving 1.37 parts in 45 parts of boiling water and cooling. It separates out as fine crystals which are removed by filtration, washed with ethanol and ether and constitutes primarily the compound of the above formula when checked by infrared analysis.

EXAMPLE 20

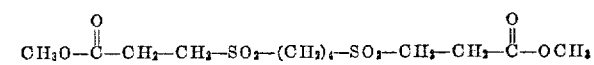

2.0 parts of methyl acrylate are dissolved in a mixture of 10 parts of water and 2 parts of ethanol, and 1.86 parts of the product of Example 2 in 5 parts of water are added. The mixture is stirred and a solid product precipitates. The reaction is stirred until completed and the product is filtered, washed with ethanol and ether.

EXAMPLE 21

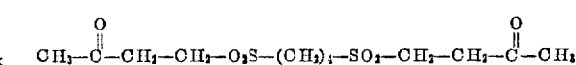

A solution of 3.72 parts of the product of Example 2 and 13 parts of water is prepared and 4.2 parts of methyl vinyl ketone is added. The solution is clarified by the addition of 5 parts of ethanol and the mixture is stirred until the precipitation of a white solid is completed. The product is filtered, washed with ethanol and ether.

We claim:

1. Sulfones having the formula

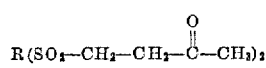

in which R is a member of the group consisting of cyclohexylene and the unsubstituted alkylenes of from two to ten carbon atoms, the sulfone groups being attached to different carbon atoms.

2. A sulfone having the formula

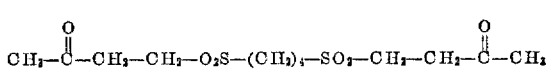

References Cited in the file of this patent

UNITED STATES PATENTS 2,492,335     Chenicek et al. _____ Dec. 27, 1949

OTHER REFERENCES

Autenrieth: Ber. Deut. Chem., vol. 24, p. 165 (1891), 260–593. (Copy in Library.)

UNITED STATES PATENT OFFICE
CERTIFICATE OF CORRECTION

Patent No. 3,084,195            April 2, 1963

Michael T. Beachem et al.

It is hereby certified that error appears in the above numbered patent requiring correction and that the said Letters Patent should read as corrected below.

Column 3, lines 13 and 14, the formula should appear as shown below instead of as in the patent:

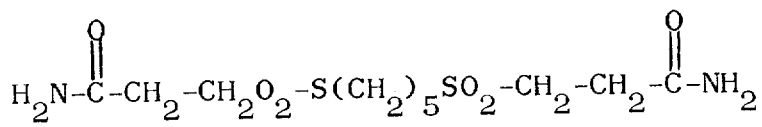

column 4, lines 14 and 15, the formula should appear as shown below instead of as in the patent:

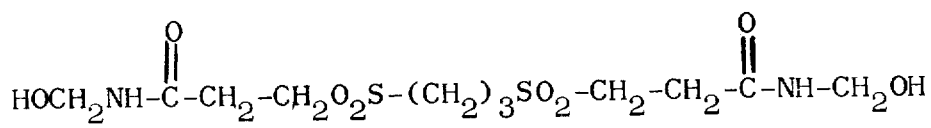

Signed and sealed this 10th day of December 1963.

(SEAL)
Attest:
ERNEST W. SWIDER

Attesting Officer

EDWIN L. REYNOLDS
Acting Commissioner of Patents